(12) United States Patent
Baig

(10) Patent No.: US 10,654,734 B2
(45) Date of Patent: May 19, 2020

(54) PROCESS AND DEVICE FOR TREATING WASTEWATERS BY OXIDATION

(71) Applicant: SUEZ INTERNATIONAL, Paris la Defense (FR)

(72) Inventor: Sylvie Baig, Montesson (FR)

(73) Assignee: SUEZ INTERNATIONAL, Paris la Defense (FR)

( * ) Notice: Subject to any disclaimer, the term of this patent is extended or adjusted under 35 U.S.C. 154(b) by 10 days.

(21) Appl. No.: 16/071,555

(22) PCT Filed: Jan. 20, 2017

(86) PCT No.: PCT/EP2017/051245
§ 371 (c)(1),
(2) Date: Jul. 20, 2018

(87) PCT Pub. No.: WO2017/125584
PCT Pub. Date: Jul. 27, 2017

(65) Prior Publication Data
US 2019/0023597 A1    Jan. 24, 2019

(30) Foreign Application Priority Data
Jan. 21, 2016   (FR) ...................................... 1650486

(51) Int. Cl.
*C02F 9/00*    (2006.01)
*C02F 1/78*    (2006.01)
(Continued)

(52) U.S. Cl.
CPC .................. *C02F 9/00* (2013.01); *C02F 1/78* (2013.01); *C02F 3/08* (2013.01); *C02F 3/12* (2013.01); *C02F 3/1221* (2013.01); *C02F 3/1247* (2013.01); *C02F 2103/34* (2013.01); *C02F 2201/782* (2013.01); *C02F 2203/006* (2013.01); *Y02W 10/15* (2015.05)

(58) Field of Classification Search
None
See application file for complete search history.

(56) References Cited

U.S. PATENT DOCUMENTS

| 4,178,239 A | * | 12/1979 | Lowther | ................... C02F 1/78 |
|---|---|---|---|---|
| | | | | 210/604 |
| 4,225,431 A | | 9/1980 | De Longe | |

(Continued)

FOREIGN PATENT DOCUMENTS

| CA | 1141044 A  | 9/2012 |
|---|---|---|
| WO | 99/41205 A1 | 8/1999 |

(Continued)

OTHER PUBLICATIONS

International Search Report, dated Apr. 28, 2017, from corresponding PCT/EP2017/051245 application.

*Primary Examiner* — Chester T Barry
(74) *Attorney, Agent, or Firm* — Young & Thompson

(57) ABSTRACT

Disclosed is a process for treating wastewaters including at least one step of aerobic biological treatment of the wastewaters in a biological reactor (3), as well as a step of ozonation during which ozone is injected into one or more circuits (1, 6) arranged to transport a respective fluid into the biological reactor (3). Also disclosed is a device relating thereto.

20 Claims, 1 Drawing Sheet

(51) Int. Cl.
*C02F 3/12* (2006.01)
*C02F 3/08* (2006.01)
*C02F 103/34* (2006.01)

(56) References Cited

U.S. PATENT DOCUMENTS

| | | |
|---|---|---|
| 6,780,319 B1 | 8/2004 | Thieblin et al. |
| 2011/0100911 A1 | 5/2011 | Livingston |
| 2011/0259832 A1 | 10/2011 | Castillo Rivera et al. |
| 2012/0012525 A1 | 1/2012 | Kuang et al. |

FOREIGN PATENT DOCUMENTS

| | | |
|---|---|---|
| WO | 2004/026773 A1 | 4/2004 |
| WO | 2007/053110 A1 | 5/2007 |
| WO | 2011/053362 A1 | 5/2011 |
| WO | 2012/122562 A2 | 9/2012 |

\* cited by examiner

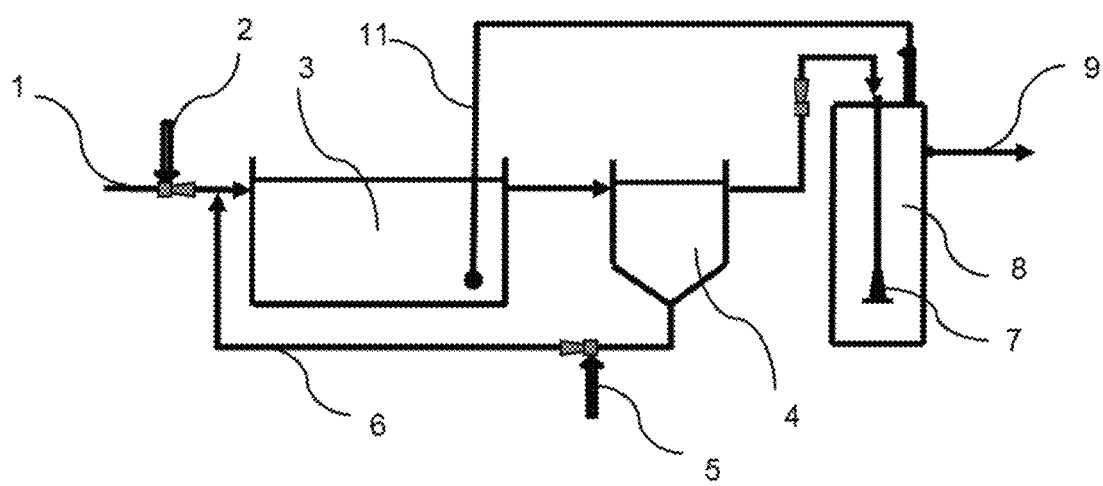

PROCESS AND DEVICE FOR TREATING WASTEWATERS BY OXIDATION

TECHNICAL FIELD

The present invention relates to the field of urban and/or industrial wastewater (also called sewage in this document) treatment.

More specifically, the present invention relates to a process and a device enabling such water to be treated to remove organic and/or inorganic compounds therefrom, in particular conservative micropollutants such as domestic and industrial chemicals as well as their by-products, pesticides, pharmaceutical products, or even personal care products.

STATE OF PRIOR ART

Preservation requirements of water resources have led to deploy wastewater treatment systems based on global parameters. Today, the European Union has the ambition to regain the good quality for aquatic environments. Directive 2000/60/EC of the European Parliament and of the Council of 23 Oct. 2000, establishing a framework for community action in the field of water policy, called The Water Framework Directive (WFD), has the ambition progressively to reduce in the long term wastewater contaminant discharges in aquatic receiving environments. Sewage sludge is also produced during the treatment of wastewater. As regard them, Council Directive 91/271/EEC of 21 May 1991, concerning urban wastewater treatment, aims at promoting recovery of sludge as soon as possible. The objective of good chemical and ecological status for all the European bodies of water involves the adoption of measures aiming at controlling discharges, emissions and losses for chemicals identified at the European level as priority substances and priority hazardous substances and established at the local/river basin/national level for relevant substances determined based on inventories.

Treatment plants make up the main point of collection and subsequently of discharge of micropollutants into environment. These micropollutants belong to different categories which reflect all the water uses and their diffusion into environment: domestic and industrial chemicals and their by-products, pesticides, pharmaceutical products and personal care products. The published results about various national inventories indicate that usual design and operation of biological sewage plants allow a limited reduction in the global micropollutant load. In particular, the load of priority substances of the WFD can decrease by 80%, whereas about 80% of the total load of pharmaceutical products entering the urban sewage plants because of domestic or hospital emissions can flow into surface water. Conservative pollutants are characterised by a strong hydrophilicity and a low biodegradability (Techniques Sciences Méthodes, numéro 3, 2015, Dossier "L'elimination de micropolluants en station d'épuration domestique").

The behaviour of micropollutants during the conventional biological wastewater purification depends on their physico-chemical properties which operate as removal pathways: volatilisation during mixing and aeration, adsorption on suspended solid matter and sludge, biodegradation, water surface photodegradation. As such, it appears that the adsorption on sludge makes up the major removal pathway of micropollutants as monitoring objects which rises the problem of the subsequent sludge treatment.

It is generally admitted that several technologies provide some efficiency to remove conservative organic compounds of wastewater. These are specific secondary biological processes with a significant sludge age such as membrane bioreactors or tertiary treatments such as membrane separation, adsorption and chemical oxidation using ozone or advanced oxidation processes. In the latter domain, document US 2011/0259832 A1 describes an advanced oxidation process combining ozonation and ultraviolet irradiation, applied as a final wastewater treatment in order to perform removal of micropollutants and disinfection.

Physical separation type treatments have the major drawback to perform pollutant transfer in a concentrated flow for membrane technologies, on the material for adsorption technologies, which demands subsequent energy-consuming treatments for destructing wastes. As regard treatments with a biological or chemical reaction, it is essential to control the formation of by-products which can be more toxic than the parent compounds.

Various ozone applications are known for treating wastewater upstream or downstream of a biological treatment (Degrémont Water Treatment Handbook, 2005). After a primary or secondary treatment, ozonation is used for disinfection and/or removal of a specific organic pollution such as that relating to detergents, colorants, toxic compounds, fats and oils or to weaken global indicators of pollution as colour, chemical oxygen demand before reusing wastewater or the discharge thereof. Examples of such applications are described in documents WO 2012/122562 A2, US 2012/0012525 A1, US 2011/0100911 A1, US 2011/0259832 A1, WO 2007/053110 A1, CA 1141044 A. Documents U.S. Pat. No. 6,780,319 B1, WO 2004/026773 A1 describe applications in which ozone oxidation is integrated to biological processes to reduce sludge production in aerobic systems.

In particular, prior art provides techniques for implementing ozone for the oxidation of organic or inorganic pollutants of water all based on the use of specific reactors (contactors). The reactors mostly encountered are of the contact column type through which water to be treated circulate, these columns being equipped with diffusers to produce at the base thereof bubbles from an air or ozonised oxygen supply. To ensure efficient oxidation and the best ozone transfer rate, it is necessary to carry out contact between water and ozone for a sufficiently long time, which implies reactors of some size. In particular, ozone transfer increases with an increasing column height such that industrial columns have a height typically between four and seven meters (Degrémont Water Treatment Handbook, 2005).

The invention has in particular the purpose to overcome all or part of water treatment techniques of the state of the art.

DISCLOSURE OF THE INVENTION

To that end, the present invention provides a wastewater treatment process comprising at least one step of aerobic biological treatment of wastewater in a biological reactor, said process further comprising a step during which ozone is directly injected and without a specific contactor in one or more circuits arranged to convey a respective fluid into the biological reactor.

Injecting directly ozone and without a specific contactor into one or more circuits arranged to convey a fluid into the biological reactor means that there is no contactor between the ozone injection point and the reactor. By ozone contactor, it is meant any device comprising an enclosure in which the fluid to be treated is retained for a determined duration before being contacted with ozone. Ozone contactors are generally bubble columns, turbine reactors, packed columns.

Thus, the present invention provides a wastewater treatment process synergistically integrating an ozone chemical oxidation and a biological oxidation within the biological reactor, enabling organic and/or inorganic compounds present in said wastewater to be biologically and chemically oxidised.

The at least one biological treatment step can consist of an aerobic treatment, for example by activated sludge.

The present invention provides many advantages with respect to conventional wastewater treatment techniques, by making it possible in particular:

in comparison with a process implementing a conventional biological treatment:
to obtain a better performance in weakening organic and/or inorganic compounds, in particular in weakening conservative micropollutants, present in wastewater,
to decrease the content of organic and/or inorganic compounds, in particular in conservative micropollutants, of sludge produced by the biological treatment;

in comparison with an ozone application as a tertiary treatment or post-treatment as described in the state of prior art, that is an application in which ozone is introduced after the biological treatment:
to reduce the ozone amount,
to reduce the device size,
to facilitate control of toxicity induced, on the one hand by virtue of the reduction in the ozone dose applied at the outlet of the biological reactor and on the other hand by producing a degradation already upstream;
to reduce contact times made without a specific contactor;
not to produce a concentrate and not to use an adsorbent material, in comparison with a treatment implementing separative membrane or adsorption techniques.

Preferably, the ozonation step can include injecting ozone in a wastewater inlet circuit by means of a first injection device, for example of the injector or static mixer type.

Thus, in this embodiment, wastewater make up the fluid conveyed by said inlet circuit into the biological reactor.

Such an ozone injection into the wastewater inlet circuit makes it possible to act in an enhanced manner on the hydrophobic materials present in wastewater, so as to hydrophilise them. This enables treatment of these materials to be facilitated in the rest of the process, in particular during the aerobic biological treatment step.

Injecting directly ozone and without a specific contactor in one or more circuits arranged to convey wastewater into the biological reactor enables a wastewater oxidation start to be triggered directly in the circuit from the injection point. In view of the flow rate in these circuits and the absence of a contactor, oxidation of the compounds is only partial. Thus, wastewater arrive without further delay in the reactor under a conditioned form which facilitates digestion thereof. In other words, the partial chemical oxidation started in the flow during the ozone injection prepares wastewater, such that the biological oxidation in the reactor is made easier. That is why the ozone chemical oxidation acts synergistically with the biological oxidation within the biological reactor.

Preferably, the ozone amount injected in the wastewater inlet circuit during the ozonation step can be lower than or equal to two grams per gram of total organic carbon of the wastewater.

In one embodiment, the process can further comprise a separation step during which sludge is separated from the wastewater, this separation step being subsequent to the at least one aerobic biological treatment step, the sludge from this separation step being conveyed into the biological reactor by a recirculation circuit, and the ozonation step possibly including injecting ozone in this recirculation circuit by means of a second injection device, for example of the injector or static mixer type.

This separation step can be made by a settler or a float or membranes for example.

Thus, in this embodiment, biological sludge enter the fluid composition conveyed by said recirculation circuit into the biological reactor.

Such an ozone injection in such a recirculation circuit enables the concentration of compounds adsorbed on the sludge by the action of ozone to be decreased.

Preferably, the amount of ozone injected into the recirculation circuit during the ozonation step can be lower than or equal to two grams per gram of total organic carbon of the wastewater.

In one embodiment, the process can further comprise an ozonation post-treatment step during which the wastewater exiting the biological reactor is contacted with ozone within a contactor. This contactor can typically be an ozonation contactor dedicated to a finishing treatment.

Preferably, the ozone amount contacted with the wastewater in the contactor during the ozonation post-treatment step is lower than or equal to two grams per gram of total organic carbon of the wastewater.

Preferably, in this embodiment, the process can further comprise a gas recycling step during which at least one part of the ozone contacted with the wastewater in the contactor is recirculated to the first and/or the second injection device, and/or is injected in an aeration zone of the biological reactor.

The present invention also relates to a wastewater treatment device comprising:
a biological reactor arranged to make at least one aerobic biological treatment step of wastewater,
one or more circuits arranged to convey a respective fluid into the biological reactor,
this device further comprising at least one injection device, for example of the injector or static mixer type, arranged to directly inject and without a specific contactor, preferably in line, ozone into one or several of said one or several circuits.

Preferably, the device can comprise:
a wastewater inlet circuit arranged to convey wastewater into the biological reactor, and
a first injection device arranged to inject ozone in the inlet circuit.

Thus, in this embodiment, the wastewater make up the fluid conveyed by said inlet circuit into the biological reactor.

In one embodiment, the device can further comprise:
a separator downstream of the biological reactor arranged to separate sludge from wastewater,
a recirculation circuit arranged to convey sludge into the biological reactor,
a second injection device arranged to inject ozone in the recirculation circuit.

Thus, in this embodiment, the fluid conveyed by said recirculation circuit into the biological reactor contains biological sludge.

The separator can be, for example, of the settler or float or membrane type.

In one embodiment, the device can further comprise a contactor arranged to contact the wastewater exiting the biological reactor with ozone. This contactor can preferably comprise a contact column and typically consists of an ozonation contactor dedicated to a finishing treatment.

Preferably, in this embodiment, the biological reactor can comprise an aeration zone, and the device can further comprise a recycling circuit arranged to convey at least one part of the ozone contacted with the wastewater into the contactor to:

the at least one injection device, and/or
said aeration zone.

In one embodiment, the biological reactor can be a conventional activated sludge reactor or a moving bed reactor or a fixed bed reactor.

The ozone can be gaseous or dissolved. Preferably, it is used as a gas.

Preferably, the ozone, in particular when it is gaseous, can comprise oxygen. The ozone concentration in the gas can range from 0.001% to 20% mass.

Further, the ozone dose injected can be controlled using a wastewater redox potential measurement.

In different combinations of the embodiments described above, the process and the device according to the invention, by performing a multiple ozone application, allow detoxification of wastewater to be treated, also called raw or primary sewage, in particular for:

a stabilisation and/or improvement in the biodegradation of organic and/or inorganic compounds such as micropollutants,
a desorption of organic and/or inorganic compounds such as parent micropollutants or metabolites adsorbed on the suspended matter in the recirculation circuit for a subsequent biodegradation, and
a finishing oxidation of said organic and/or inorganic compounds as well as of the oxidation products.

More generally, the process and the device according to the invention enhance the ozonation advantages in order to support the efficiency of the biological treatment under the effect of:

the easy conversion of toxic products and non-biodegradable hydrophobic compounds at the inlet of the biological treatment,
the rapid attack of micropollutants adsorbed on the sludge in the recirculation circuit,
the improvement of the biodegradation velocity by virtue of the promotion of growth of some microorganisms and by virtue of oxygen supply by recycling the ozonised gas contacted with the wastewater in the ozonation contactor dedicated to the finishing treatment.

DESCRIPTION OF THE FIGURES AND EMBODIMENTS

Further advantages and features of the invention will appear upon reading the detailed description of implementations and embodiments in no way limiting, and the appended FIG. 1 which schematically represents a device according to the invention.

Since the embodiments described hereinafter are in no way limiting, alternatives of the invention could in particular be considered, which only comprise a selection of the characteristics described, isolated from the other characteristics described, even if this selection is isolated within a sentence comprising these other characteristics, if this selection of characteristics is sufficient to provide a technical advantage or to differentiate the invention with respect to the state of the art. This selection comprises at least one characteristic, preferably a functional characteristic without structural details, or with only a part of the structural details if this part only is sufficient to provide a technical advantage or to differentiate the invention with respect to the state of prior art.

FIG. 1 schematically represents a wastewater treatment device according to the invention.

The device comprises a biological reactor 3 that can, alternatively be a conventional activated sludge reactor or a movable bed reactor or a fixed bed reactor.

By "conventional activated sludge reactor", it is meant an aeration tank generally followed by a clarifier, the wastewater purification being made according to a succession of tanks disposed behind each other.

By "movable bed reactor" or "fluidised movable bed reactor", it is meant an aeration tank (or sequential aeration tank) in which supporting materials maintained in fluidisation by the air supply of the process are submerged and which enables the amount of purifying biomass to be increased, the one which is developed on the surfaces of submerged materials. In this way, the advantage of increasing the treatment ability in comparison with a conventional activated sludge biological reactor is achieved by providing for the same load to be treated, a lower reactor volume.

By "fixed bed reactor", it is meant filters packed with mineral materials through which the water to be purified passes. In this way, the advantage of filtering purified water at the same time in a single treatment step is achieved.

The device further comprises a wastewater inlet circuit 1 arranged to supply the biological reactor 3 with wastewater.

The wastewater conveyed into the biological reactor 3 by the inlet circuit 1 arrive more precisely in an aeration zone, or tank, of this reactor.

In this exemplary embodiment, the biological reactor is arranged to make at least one aerobic biological treatment step, for example with activated sludge. In particular, the wastewater located in the biological reactor 3 is contacted with bacteria capable of oxidising by the biological pathway organic and/or inorganic compounds present in the wastewater. In other words, the at least one biological treatment step with activated sludge enables such compounds to be degraded by these bacteria.

After they have been subjected to the at least one aerobic biological treatment step, the wastewater exit the biological reactor 3.

In the example of FIG. 1, the wastewater exiting the biological reactor 3 is conveyed to a separator 4, for example of the clarifier or secondary settling tank or settler type, mounted downstream of the biological reactor 3. The separator 4 is arranged to perform a settling step during which biological flocs are typically separated from wastewater, these biological flocs being build up during the aerobic biological treatment step, within the biological reactor 3.

In this example, sludge from this settling step is conveyed into the biological reactor 3 by a recirculation circuit 6.

In one exemplary embodiment, the biological reactor 3 can include an inlet common for the inlet circuit 1 and the recirculation circuit 6. Alternatively, a separated inlet for each of both these circuits 1 and 6 can be provided (which is not represented).

The device of FIG. 1 further comprises a first 2 and a second 5 injection device. In this example, the first injection device 2 is arranged to directly inject and without a specific contactor ozone, preferably as a gas, in the wastewater inlet circuit 1; the second injection device 5 is arranged to directly inject and without a specific contactor ozone, preferably as a gas, into the recirculation circuit 6. Alternatively, the device according to the invention could comprise a single one of both these injection devices (not represented). The first 2 and/or the second 5 injection device are for example an injector or a static mixer set in the inlet circuit 1 or in the recirculation circuit 6 without specific contactor.

Through this first 2 and/or this second 5 injection device, ozone can be introduced, during the at least one aerobic biological treatment step, so as to oxidise by the biological pathway and by the chemical pathway organic and/or inorganic compounds present in said wastewater. The partial chemical oxidation which starts in the flow during ozone injection prepares wastewater, such that the aerobic biological treatment in the reactor is facilitated. In this way, the ozone chemical oxidation acts synergistically with the biological oxidation within the biological reactor 3.

In one embodiment, the device further comprises a contactor 8 arranged to contact the wastewater exiting the biological reactor 3, and exiting in the example of FIG. 1 the separator 4, with ozone. An ozonation post-treatment is thus performed.

In this example, the contactor 8 comprises a contact column in which the wastewater is placed, and the contacting thereof with ozone is made using a diffuser 7.

The wastewater that underwent such an ozonation post-treatment is discharged by a discharge circuit 9.

The device of FIG. 1 further comprises a recycling circuit 11 arranged to convey at least one part of the ozone contacted with the wastewater in the contactor 8 to the aeration zone of the biological reactor 3, making up a gas recycling step. Alternatively or additionally, the ozone thus recovered on the contactor 8 can be conveyed to the first 2 and/or the second 5 injection device (not represented).

Preferably, the ozone introduced during the at least one aerobic biological treatment step makes up an amount lower than or equal to two grams per gram of total organic carbon of the wastewater.

The inventors have tested the efficiency of the device and process according to the invention using two situations implementing a biological reactor 3 and a contactor 8 comprising a gas and water countercurrent ozonation column.

In each of both situations, the same urban primary effluent fed the device at a flow rate of 1 m³/h, the retention time of wastewater in the biological reactor 3 was 10 h, the concentration of sludge was 3.5 g/L and the sludge age was 10 days.

The first situation, consisting of a conventional treatment, is characterised by the following elements:
absence of an injection device on the inlet circuit 1 and the recirculation circuit 6;
contact time of 15 min in the contactor 8 and ozone dose injected in the contactor 8 of 17 mg/L.

The second situation, consisting of a treatment according to the invention, is characterised by the following elements:
presence of two injection devices 2 and 5 consisting of gas hydroejectors;
presence of a recycling circuit 11 conveying, after compression, gas taken at the event of the ozonation column 8 to the aeration zone of the biological reactor 3;
ozone doses injected by the injection devices 2 and 5 respectively of 7 mg/L;
contact time of 5 min in the contactor 8 and ozone dose injected in the contactor 8 of 5 mg/L.

A sampling program has been performed after a steady state observation period for several months based on the performance in terms of aggregated indicators of pollution. The sampling methodology applied for analysing the micropollutants was based on taking daily mean samples proportional to the flow rate, preserved in cold, combined with the use of a glass and a Teflon material, and a conveyance of the samples to laboratories within a delay lower than 24 h. The samplings have been made in dry weather, for 2 to 3 consecutive days.

The table below summarises the results obtained as regards the micropollutants detected at the inlet of the system and conservative at the end of the activated sludge biological treatment. An efficiency of 100% is achieved as soon as the substance is no longer detected in the effluent treated.

| Compound | Concentration in the primary effluent in µg/L | Removal rate in % | |
| --- | --- | --- | --- |
| | | Situation 1 | Situation 2 |
| Carbamazepine | 0.17 | 100 | 100 |
| Diclofenac | 0.93 | 100 | 100 |
| Roxithromycin | 0.40 | 98 | 100 |
| Sulphamethoxazole | 0.47 | 99 | 100 |
| Nonylphenols | 3.30 | 92 | 97 |
| Diuron | 1.08 | 96 | 100 |
| Chlofenvinphos | 1.75 | 86 | 100 |
| Atrazine | 0.93 | 70 | 100 |

These results indicate that the process and device according to the invention (situation 2), in comparison with a process and device not involving an oxidation by biological pathway and by chemical pathway synergistically (situation 1), allow a better weakening as regards substances which are always detected in the effluent from the reference system. Further, this better performance has been achieved by applying a global ozone dose reduced by 30%.

Of course, the present invention is not limited to the examples just described and many modifications could be provided to those examples without departing from the scope of the invention. Furthermore, the different characteristics, forms, alternatives and embodiments of the invention can be associated with each other according to various combinations insofar as they are not incompatible or exclusive to each other.

The invention claimed is:

1. A wastewater treatment process comprising at least one step of aerobic biological treatment of wastewater in a biological reactor (3), and a step during which ozone is directly injected and without an ozone contactor in one or more circuits (1, 6) arranged to convey a respective fluid into the biological reactor (3), the ozone chemical oxidation acting synergistically with the biological oxidation within the biological reactor, without an ozone contactor.

2. The process according to claim 1, wherein the ozonation step includes injecting ozone in a wastewater inlet circuit (1) by means of a first injection device (2).

3. The process according to claim 2, wherein the amount of ozone injected into the wastewater inlet circuit (1) during the ozonation step is lower than or equal to two grams per gram of total organic carbon of the wastewater.

4. The process according to claim 1, further comprising a separation step during which sludge is separated from the wastewater, this separation step being subsequent to the at least one aerobic biological treatment step, wherein the sludge from this separation step is conveyed in the biological reactor (3) by a recirculation circuit (6), wherein the ozonation step includes injecting ozone in this recirculation circuit (6) by means of a second injection device (5).

5. The process according to claim 4, wherein the ozone amount injected in the recirculation circuit (6) during the ozonation step is lower than or equal to two grams per gram of total organic carbon of the wastewater.

6. The process according to claim 2, further comprising an ozonation post-treatment step during which the wastewater exiting the biological reactor (3) is contacted with ozone within an ozone contactor (8).

7. The process according to claim 6, wherein the ozone amount contacted with the wastewater in the ozone contactor (8) during the ozonation post-treatment step is lower than or equal to two grams per gram of total organic carbon of the wastewater.

8. The process according to claim 6, further comprising a gas recycling step during which at least one part of the ozone contacted with the wastewater in the ozone contactor (8) is recirculated to the first and/or the second injection device, and/or is injected in an aeration zone of the biological reactor (3).

9. The process according to claim 1, wherein the ozone injected is gaseous or dissolved.

10. The process according to claim 1, wherein the ozone comprises oxygen.

11. A wastewater treatment device comprising:
a biological reactor (3) arranged to make at least one aerobic biological treatment step of the wastewater,
one or more circuits (1, 6) arranged to convey a respective fluid into the biological reactor (3),
further comprising at least one injection device (2, 5) arranged to directly inject and without an ozone contactor ozone in one or more of said one or more circuits (1, 6), the ozone chemical oxidation acting synergistically with the biological oxidation within the biological reactor, without an ozone contactor.

12. The device according to claim 11, further comprising:
a wastewater inlet circuit (1) arranged to convey the wastewater into the biological reactor (3), and
a first injection device (2) arranged to inject ozone in the inlet circuit (1).

13. The device according to claim 11, further comprising:
a separator (4) downstream of the biological reactor (3) arranged to separate sludge from wastewater,
a recirculation circuit (6) arranged to convey the sludge into the biological reactor (3),
a second injection device (5) arranged to inject ozone in the recirculation circuit (6).

14. The device according to claim 11, further comprising an ozone contactor (8) arranged to contact the wastewater exiting the biological reactor (3) with ozone.

15. The device according to claim 14, wherein the biological reactor (3) comprises an aeration zone, and wherein the device further comprises a recycling circuit (11) arranged to convey at least one part of the ozone contacted with the wastewater into the ozone contactor (8) to:
the at least one injection device (2, 5), and/or
said aeration zone.

16. The device according to claim 11, wherein the biological reactor (3) is a conventional activated sludge reactor or a moving bed reactor or fixed bed reactor.

17. The process according to claim 1, further comprising an ozonation post-treatment step during which the wastewater exiting the biological reactor (3) is contacted with ozone within an ozone contactor (8).

18. The process according to claim 3, further comprising an ozonation post-treatment step during which the wastewater exiting the biological reactor (3) is contacted with ozone within an ozone contactor (8).

19. The process according to claim 4, further comprising an ozonation post-treatment step during which the wastewater exiting the biological reactor (3) is contacted with ozone within an ozone contactor (8).

20. The process according to claim 5, further comprising an ozonation post-treatment step during which the wastewater exiting the biological reactor (3) is contacted with ozone within an ozone contactor (8).

* * * * *